United States Patent
Shin et al.

(10) Patent No.: US 7,072,690 B2
(45) Date of Patent: *Jul. 4, 2006

(54) MULTI-BAND ANTENNA AND NOTEBOOK COMPUTER WITH BUILT-IN MULTI-BAND ANTENNA

(75) Inventors: Hyo Sik Shin, Gyeonggi-Do (KR); Kwang Seog Bang, Gyeonggi-Do (KR); Eung Bok Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 500 days.

This patent is subject to a terminal disclaimer.

(21) Appl. No.: 10/310,980

(22) Filed: Dec. 6, 2002

(65) Prior Publication Data

US 2003/0124985 A1    Jul. 3, 2003

Related U.S. Application Data

(63) Continuation-in-part of application No. 10/036,545, filed on Jan. 7, 2002, now Pat. No. 6,957,085.

(30) Foreign Application Priority Data

Apr. 11, 2001 (KR) ............... 2001-19281
Jun. 15, 2001 (KR) ............... 2001-33952

(51) Int. Cl.
*H04M 1/00* (2006.01)
*H04B 1/38* (2006.01)

(52) U.S. Cl. ............... 455/557; 455/556.1; 455/575.1; 455/575.3; 455/575.7; 455/575.8; 455/556.2; 343/702; 343/725; 343/795; 343/864

(58) Field of Classification Search ............ 455/575.1, 455/575.8, 557, 575.7, 556.1, 556.2, 575.6, 455/575.3

See application file for complete search history.

(56) References Cited

U.S. PATENT DOCUMENTS

| | | | |
|---|---|---|---|
| 4,497,036 A | 1/1985 | Dunn | |
| 5,331,506 A | 7/1994 | Nakajima | |
| 5,365,246 A | 11/1994 | Rasinger et al. | ............ 343/702 |
| 5,644,319 A | 7/1997 | Chen et al. | |
| 5,684,672 A * | 11/1997 | Karidis et al. | .............. 361/683 |
| 5,802,484 A * | 9/1998 | Hamilton et al. | ........... 455/558 |
| 5,809,403 A | 9/1998 | MacDonald, Jr. et al. | |

(Continued)

FOREIGN PATENT DOCUMENTS

EP   0543645   5/1993

(Continued)

*Primary Examiner*—Marceau Milord
(74) *Attorney, Agent, or Firm*—Fleshner & Kim, LLP

(57) ABSTRACT

A multi-band antenna and a notebook computer with a built-in multi-band antenna are disclosed. Since the multi-band antenna is installed at the inner side of a upper and a lower case, it is much favored for a radio communication when a computer is in use by standing up a display device. The multi-band antenna includes at least two transmitting and receiving parts formed with different lengths to fit frequency bands, so that a remote communication of at least two or more bands can be made. The multi-band antenna is positioned between liquid crystal and a side wall of the lower case, and a grounding unit is installed to contact a liquid crystal frame. That is, since the grounding unit is grounded to the liquid crystal frame and the bracket, substantially, the liquid crystal frame and the bracket are wholly grounded to ensure a stable radio frequency communication.

25 Claims, 7 Drawing Sheets

U.S. PATENT DOCUMENTS

| | | | |
|---|---|---|---|
| 5,828,348 A * | 10/1998 | Tassoudji et al. | 343/895 |
| 5,848,170 A * | 12/1998 | Mahieux et al. | 381/92 |
| 5,867,131 A * | 2/1999 | Camp et al. | 343/797 |
| 5,886,669 A | 3/1999 | Kita | |
| 5,914,690 A | 6/1999 | Lehtola et al. | |
| 6,100,850 A | 8/2000 | Utsumi | 343/702 |
| 6,133,883 A | 10/2000 | Munson et al. | |
| 6,181,284 B1 | 1/2001 | Madsen et al. | 343/702 |
| 6,212,067 B1 | 4/2001 | Nakajima et al. | |
| 6,339,400 B1 * | 1/2002 | Flint et al. | 343/702 |
| 6,362,792 B1 | 3/2002 | Sawamura et al. | |
| 6,385,037 B1 | 5/2002 | Howell et al. | |
| 6,441,791 B1 * | 8/2002 | Oka | 343/713 |
| 6,477,871 B1 | 11/2002 | Shaw et al. | |
| 6,728,559 B1 * | 4/2004 | Masaki | 455/575.5 |
| 6,853,336 B1 * | 2/2005 | Asano et al. | 343/702 |
| 2002/0021250 A1 | 2/2002 | Asano et al. | 343/702 |
| 2003/0161093 A1 | 8/2003 | Lam et al. | |

FOREIGN PATENT DOCUMENTS

| | | |
|---|---|---|
| EP | 0484454 | 9/1994 |
| EP | 1079296 | 7/2000 |
| KR | 10-1997-0028939 | 6/1997 |
| KR | 10-1997-0062858 | 9/1997 |
| KR | 10-1998-0041789 | 8/1998 |

* cited by examiner

MULTI-BAND ANTENNA AND NOTEBOOK COMPUTER WITH BUILT-IN MULTI-BAND ANTENNA

This application is a continuation-in-part of application Ser. No. 10/036,545 filed Jan. 7, 2002 now U.S. Pat. No. 6,957,085, which claims priority to Korean Application Serial Nos. 19281/2001 filed Apr. 11, 2001 and 33952/2001 filed Jun. 15, 2001, the entire disclosure of each is incorporated herein by reference.

BACKGROUND OF THE INVENTION

1. Field of the Invention

The present invention relates to a multi-band antenna and a notebook computer with a built-in multi-band antenna and, more particularly, to a notebook computer in which a multi-band antenna is installed at the inner side of a corner portion of a display device, not being damaged by an external impact or not causing an inconvenience in use, and several transmitting and receiving parts are formed at the antenna to correspond to multi-band radio frequency transmission and reception.

2. Description of the Background Art

A mobile electronic equipment is operated by power supplied from a small portable battery, includes a portable computer, a laptop computer, a palmtop computer, a notebook computer, etc. Research has been ongoing to make the mobile electronic equipment more compact and lighter in weight and to have a multifunctional capacity, and also for making it possible to communicate by radio with an external instrument. Especially, there have been introduced devices which can communicate with an external instrument wirelessly without using cable to access a network with a LAN card or a modem card inserted in a main body.

In order to adopt the radio communication to the mobile electronic equipment, it is requisite to adopt a high efficiency antenna. But, notably, there are inconvenient aspects and restrictions in designing such an antenna and in its adaptation to the mobile electronic equipment due to the special requirement that it be mounted for use in a compact mobile electronic equipment.

For one example of a known antenna for the notebook computer, Korean Patent Laid Open No. 1998-41789 discloses an antenna bendably installed at one side of an upper surface of a main body of a notebook computer. The antenna in Korean Patent Laid Open No. 1998-41789 is bent and received in a recess portion formed in the vicinity of the antenna when the computer is not in use, while, when the computer is in use, the part of the display device of the computer is stood and the antenna bent at the recess portion is stood vertically for use. This type of antenna has a high risk that it could be easily damaged as a user inadvertently covers the display device after the antenna is stood vertically for use.

For another example, Korean Patent Laid Open No. 1997-28939 and Korean Patent Laid Open No. 1997-62858 disclose a whip antenna which is installed inside of one side of a display device of a notebook computer. In order to maximize efficiency in its use, the antenna is drawn out to be extended from the display device and drawn back for a firmness and convenience in non-use. This antenna also has such a problem that it can be damaged by being caught by human or an object since it is used in a state of being drawn out.

In consideration of those problems, recently, built-in antennas which are installed inside an electronic equipment are being developed. These built-in antennas can show an advanced technique with its resolving of the damage or the inconvenience in use caused by the externally protruded antennas. But operated only in the general frequency band of 2.4 GHz, it does not work in the frequency band of 5.2 GHz, a fresh frequency band.

That is, since the built-in antennas under the development is designed to be operable for only one frequency band, a radio communication of an electronic equipment with the built-in antenna is not possible in an area where the designed frequency band is not provided.

SUMMARY OF THE INVENTION

Therefore, an object of the present invention is to provide a multi-band antenna and notebook computer with a built-in multi-band antenna.

Another object of the present invention is to provide a notebook computer with a built-in multi-band antenna that is capable of preventing an antenna from damaging by being caught by a human or an object by installing the antenna inside a display device so that the antenna is stood when the display device of a notebook computer is stood.

Still another object of the present invention is to provide a multi-band antenna suitable to transmit and receive an electromagnetic wave in at least two or more frequency bands.

Yet another object of the present invention is to provide a multi-band antenna suitable not to increase a size of an overall product by providing the same or the smaller antenna in size such as thickness or height by comparing the size of the antenna with the thickness of liquid crystal installed inside the display device or parts of a display device such as a bracket for fixing liquid crystal to the display device.

Another object of the present invention is to provide a multi-band antenna suitable to improvement of an efficiency of a radio frequency communication by obtaining a sufficient grounding area.

To achieve these and other advantages and in accordance with the purpose of the present invention, as embodied and broadly described herein, there is provided a multi-band antenna of a notebook computer in which a display device is coupled to cover a main body and has a liquid crystal frame fixing liquid crystal and a bracket fixed at an outer side of the liquid crystal frame, which includes: a grounding unit installed at both inner sides of the display device and vertically inserted between the liquid crystal frame and the bracket; a grounding connection unit extended outwardly from a lower end portion of the grounding unit and disposed in a horizontal direction at a lower side of the bracket; an antenna line fixing unit formed vertically at an outer end portion of the grounding connection unit; and at least two or more transmitting and receiving units formed upwardly by being extended from the antenna line fixing unit and transmitting and receiving an electromagnetic wave.

To achieve the above objects, there is also provided a notebook computer with a built-in multi-band antenna which includes: a down-case; a PCB installed at the down-case and connected to a radio communication device; a main body coupled to the down-case, the main body including an up-case with a keyboard positioned at an upper surface thereof; a display device rotatably installed to the main body; a lower case constituting the display device and having a bottom and a side wall; a liquid crystal mounted at the lower case and having a liquid crystal frame installed at an outer circumference; and a multi-band antenna having a grounding unit and at least two or more transmitting and receiving units with different lengths, and being installed between the liquid crystal frame and the side wall of the lower case as the grounding unit is fixed to the liquid crystal frame in contacting state.

With the multi-band antenna and the notebook computer with a built-in multi-band antenna of the present invention, the antenna is installed at both inner sides of the display device so that when a user stands the display device to use the notebook computer the antenna is stood together with the display device, comparatively high, and thus, radio frequency communication is easy and the antenna is prevented from being damaged by being caught by a human or an object.

With the notebook computer with a built-in antenna in the present invention, since the grounding unit is inserted between the liquid crystal frame and the bracket to extend the grounding over a comparatively wide area, so as to make a stable radio communication. And with the two or more transmitting and receiving units with different lengths, a multi-band radio frequency transmission and reception can be made. In addition, an electronic equipment with the multi-band antenna can be freely used without restriction to frequency band in areas with different radio frequency bands.

With the notebook computer with a built-in antenna of the present invention, since the antenna transmitting unit and the liquid crystal frame are isolated as wide as the grounding connection unit, so that radio wave can be transmitted and received without being interrupted by the liquid crystal panel or the liquid crystal frame, ensuring a favorable transmission and reception.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
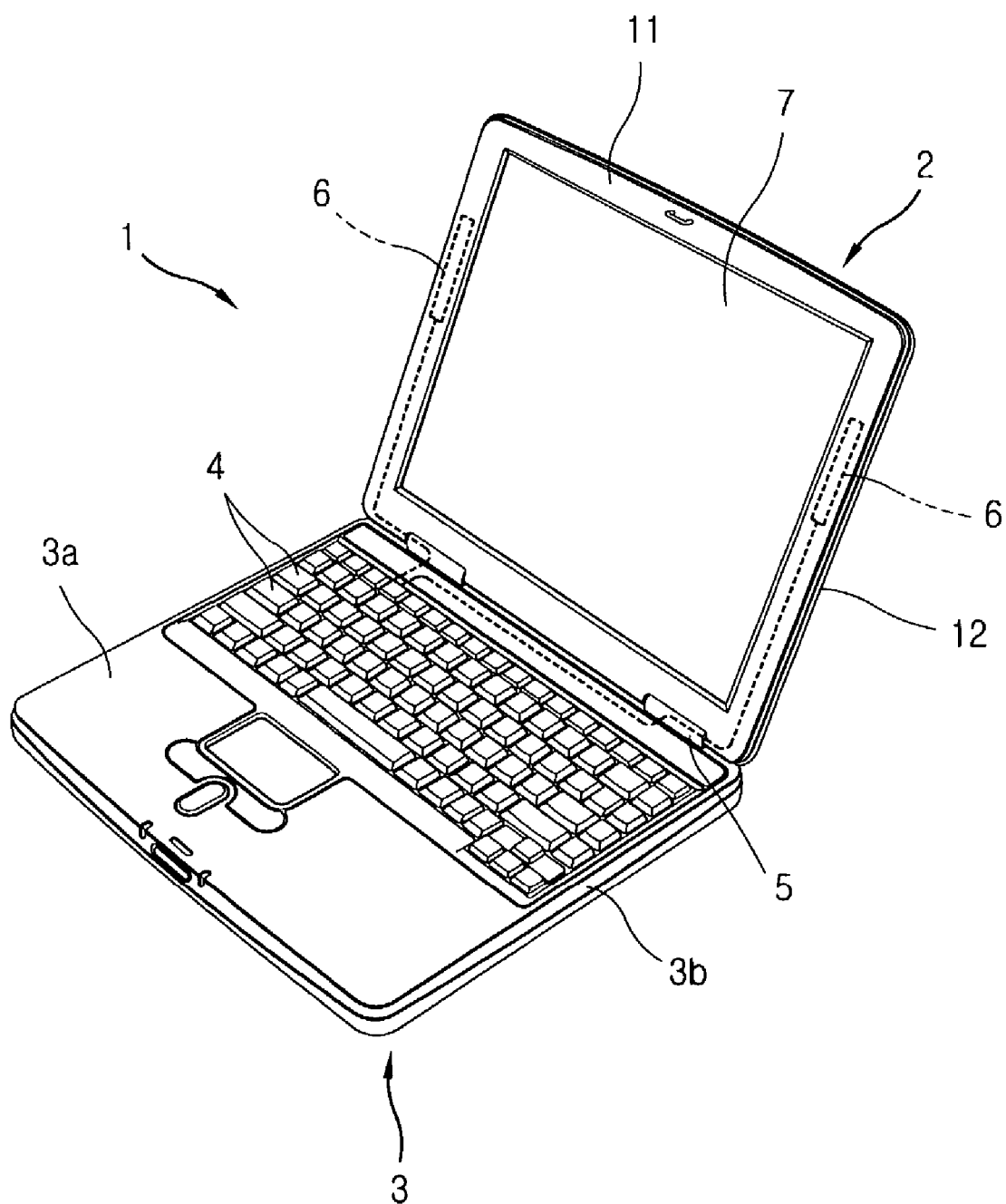
FIG. 1 is a perspective view showing a notebook computer with a multi-band antenna in accordance with the present invention.

FIG. 1 is a perspective view showing a notebook computer with a multi-band antenna in accordance with the present invention.

A mobile electronic equipment 1 with an antenna 6 includes a notebook computer, a laptop computer, a palmtop computer, or the like. A main body 3 is formed as an up-case 3a and a down-case 3b are coupled. A keyboard 4 having a plurality of keys for inputting data is installed at an upper surface of the up-case 3a. A PCB is installed inside the down-case 3b, which various modules such as an optical disk drive, a hard disk drive or the like are connected to and mounted on. A LAN card (not shown) enabling a radio frequency communication is provided at one side of the PCB.

At a rear end portion of the upper surface of the main body 3, there is provided a display device 2 is rotatably installed with a hinge mechanism 5 between a user's keyboard visible position and a user's keyboard invisible (closed) position. The display device 2 includes a liquid crystal 7, and two multi-band antennas 6 inserted respectively at left and right sides of liquid crystal 7. In the display device 2, an upper case 11 is coupled at an outer circumference of a lower case 12, and the middle portion of the upper case 11 is opened so that the user can view the liquid crystal 7.

Figure 2:
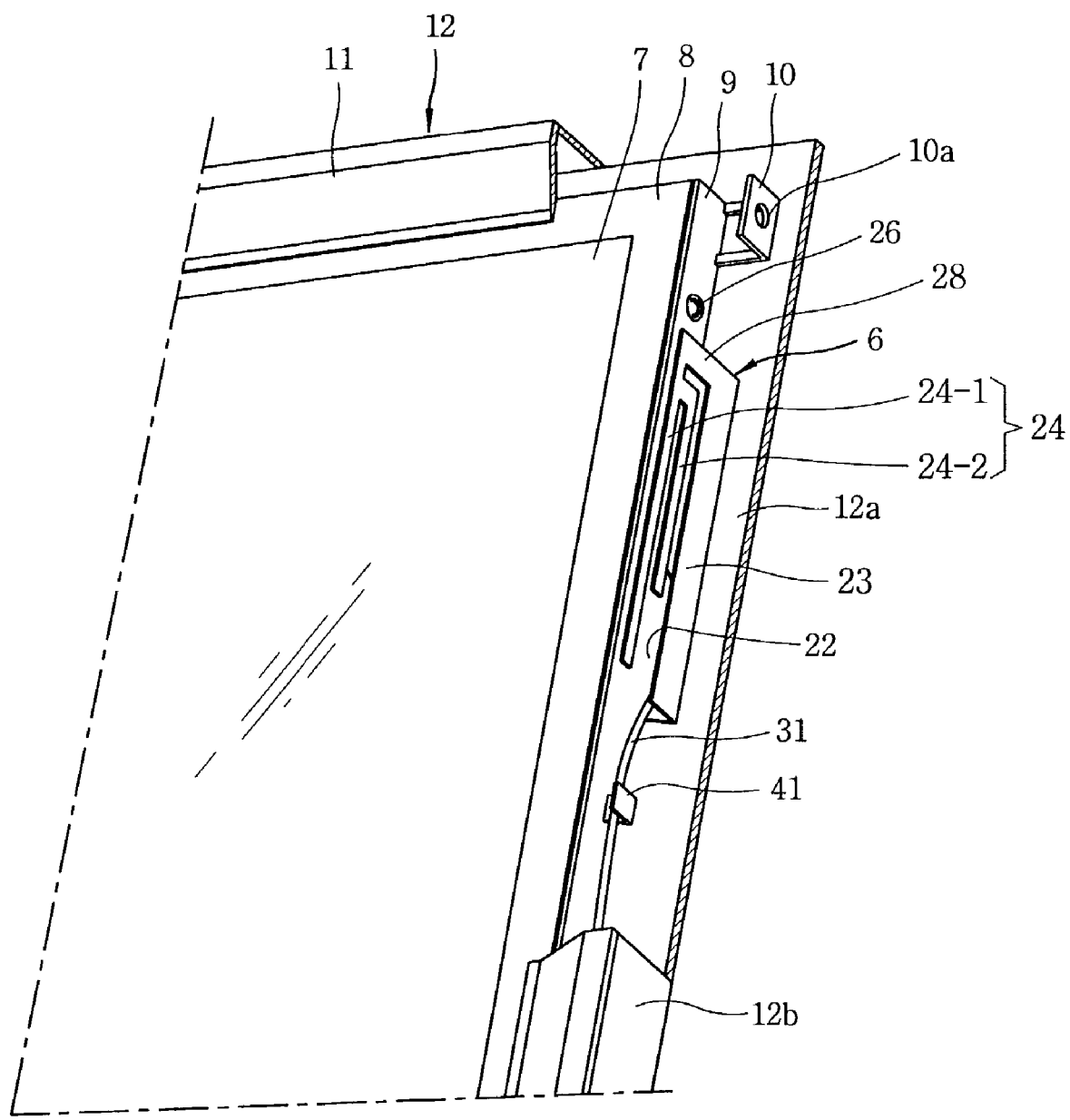
FIG. 2 is a perspective view showing a partially cut-out portion where the multi-band antenna is installed.
Figure 3:
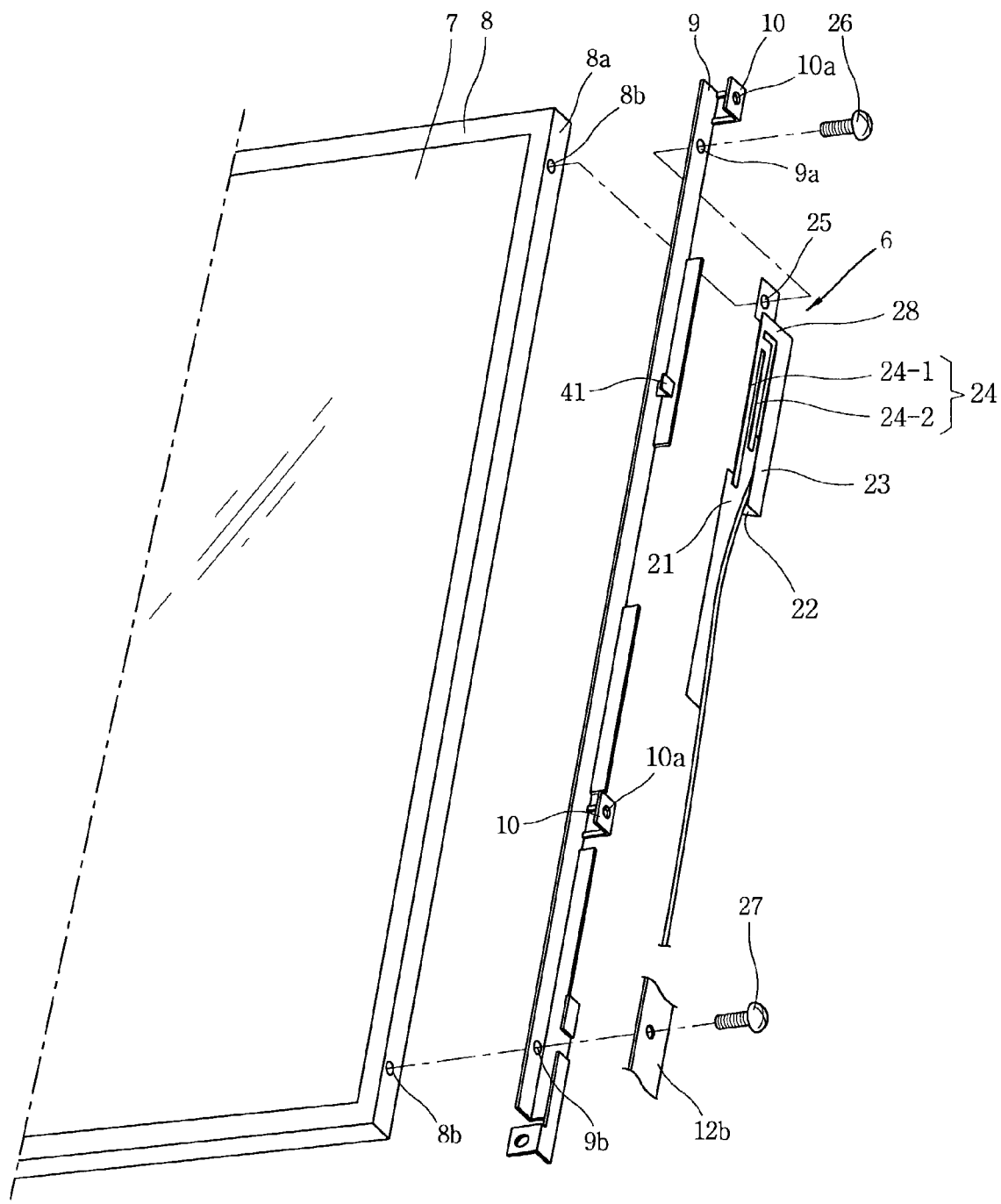
FIG. 3 is an exploded perspective view of FIG. 2.

FIGS. 2 and 3 show the inside of the display device 2, For the convenience's sake, only the right portion of the display device 2 is shown, which is symmetrically same with the left portion.

The multi-band antenna 6 may be installed only at the left side or only at the right side according to a user's intention. The lower case 12 of the display device 2 includes a bottom 12a and a side wall 12b integrally extended by being bent from the end of the bottom 12a. The liquid crystal 7 is positioned inside the lower case 12, on which various information is displayed.

The liquid crystal frame 8 made of a metal is integrally connected with the liquid crystal 7 along the outer circumference of the liquid crystal 7, and a screw fixing hole 8b is formed at upper and lower portion at the side 8a of the liquid crystal frame 8. A bracket 9 fixed to the lower hinge mechanism 5 at its lower portion is positioned at both sides 8a of the liquid crystal 7 to which the liquid crystal frame 8 is fixed, and holes 9a and 9b are formed at the bracket 9, corresponding to the screw fixing hole 8b.

The liquid crystal 7, the antenna 6 and the bracket 9 are connected and fixed by a screw.

That is, in a state that the screw fixing hole 8b of the upper portion of left and right sides of the liquid crystal frame 8, the hole 25 of the grounding unit 21 formed at the antenna 6 and the hole 9a of the bracket 9 are sequentially conformed, the screw 26 penetrates the hole 9a of the bracket 9 and the hole 25 of the multi-band antenna 6 to fix the bracket 9 and the multi-band antenna 6 to the screw fixing hole 8b of the liquid crystal frame 8. Then, the bracket 9 and the grounding unit 21 of the multi-band antenna 6 are tightly attached and fixed to the upper side 8a of the liquid crystal frame 8.

Next, in a state that the screw fixing hole 8b at the lower portion of the left and right sides of the liquid crystal frame 8 and the hole 9b of the bracket 9 are conformed, the screw 26 penetrates the hole 9a of the bracket 9 to fix the bracket 9 to the lower screw fixing hole 8b of the liquid crystal frame 8. Then, the lower portion of the side 8a of the liquid crystal frame 8 and the bracket 9 are tightly attached and fixed to each other.

The bracket 9 is formed about as long as the side 8a of the liquid crystal frame 8, and connection portions 10 are formed to be respectively bent and extended from the upper end and from the about middle portion. The connection portions 10 have a screw fixing hole 10a. The connection portions 10 are connected to the both walls 12b of the lower case 12 and fixed to the side wall 12b of the lower case 12 as a screw (not shown).

Thereafter, the upper case 11 is fixed to an upper portion of the liquid crystal 7 fixed to the lower case 12. The upper case 11 is fixed such that its outer circumferential portion is connected to the side wall 12b of the lower case 12. Accordingly, the liquid crystal frame 8, the multi-band antenna 6 and the bracket 9 are invisibly positioned inside the display device 2.

Figure 4:
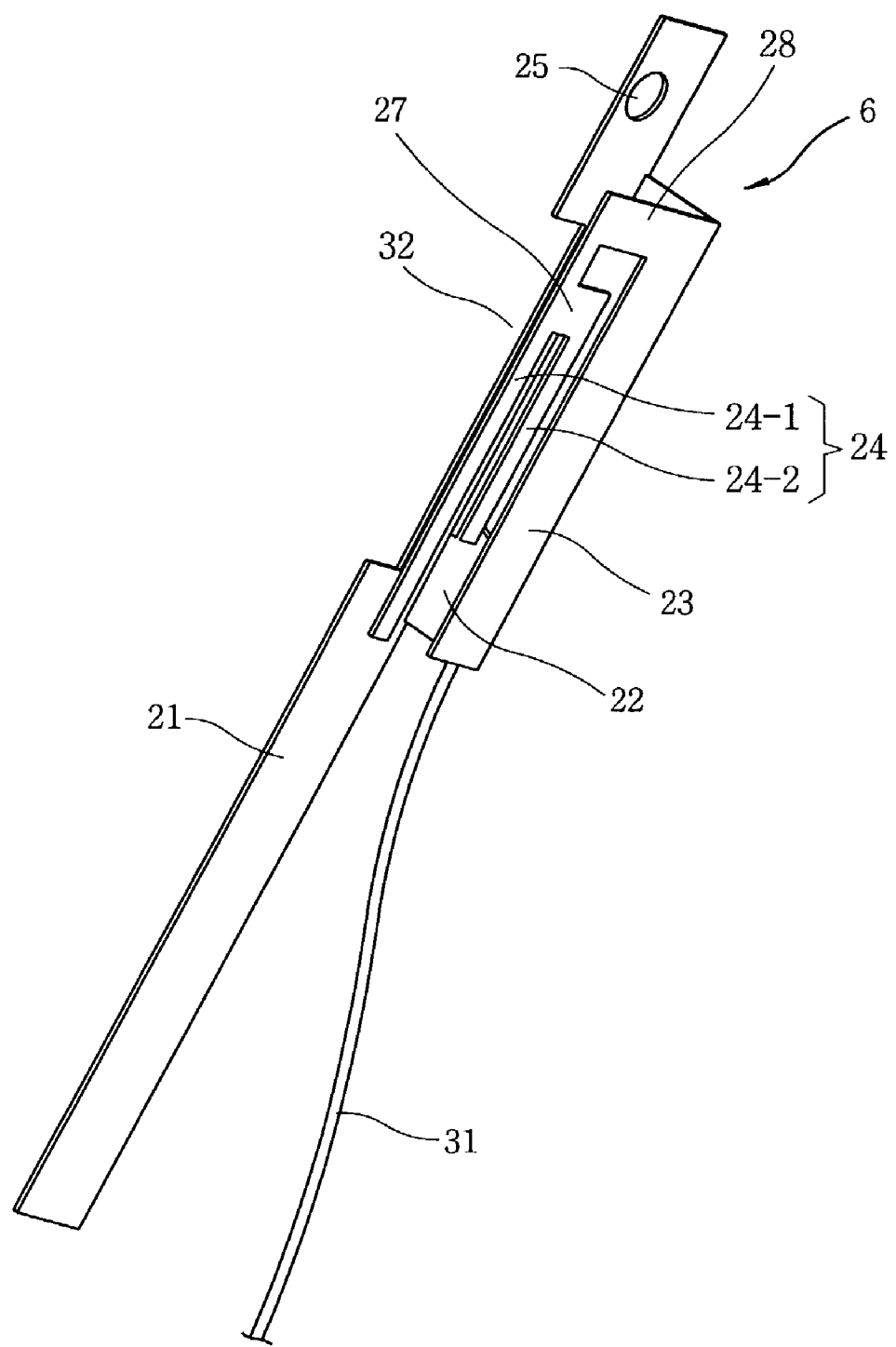
FIG. 4 is a perspective view showing the first embodiment of a transmitting unit of the multi-band antenna in accordance with the present invention.
Figure 5:
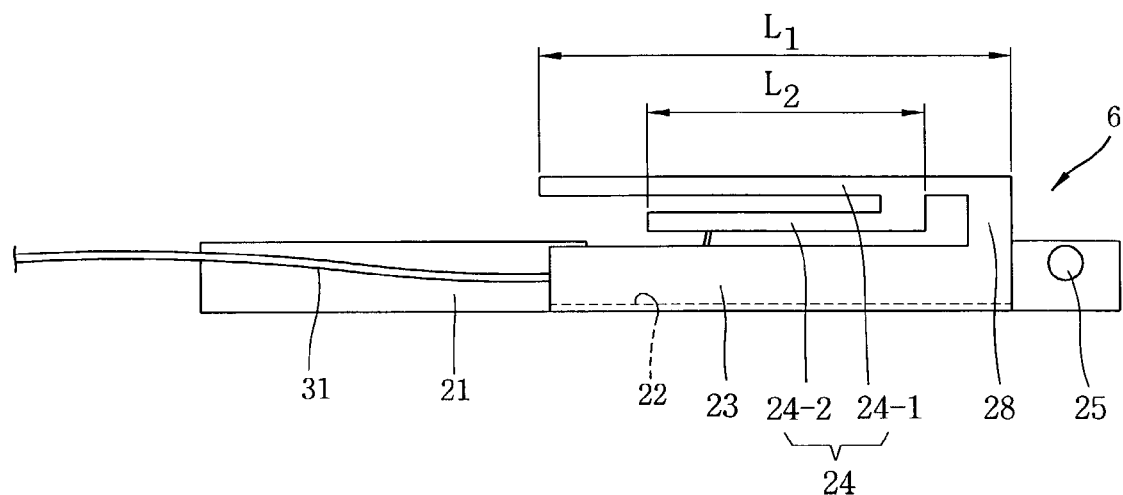
FIG. 5 is a front view of FIG. 4.
Figure 6:
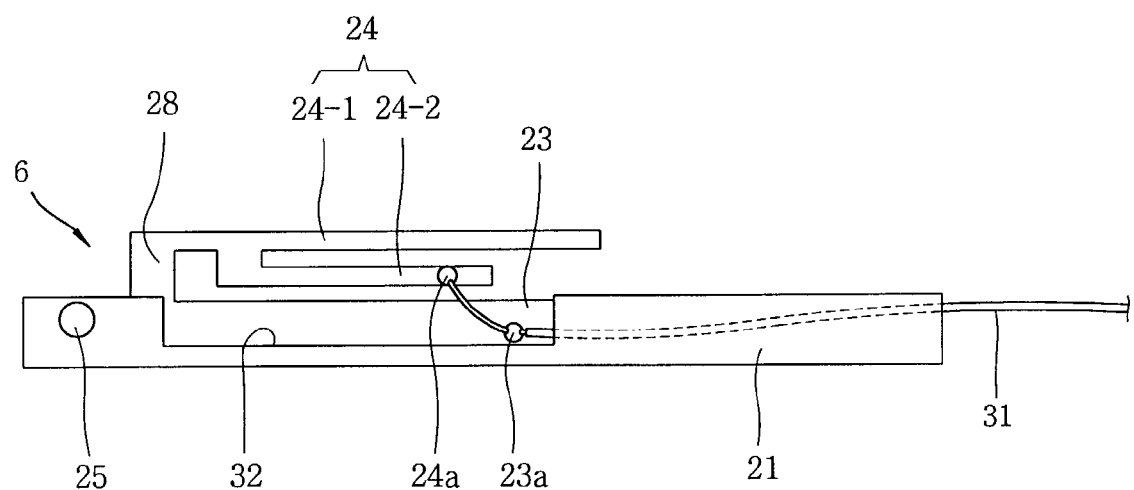
FIG. 6 is a rear view of FIG. 4.

FIGS. 4, 5 and 6 show details of the shape of the multi-band antenna in accordance with a first embodiment of the present invention.

As shown, the multi-band antenna 6 is manufactured by pressing a plate body made of phosphor bronze such that a grounding unit 21, a grounding connection unit 22, an antenna line fixing unit 23 and a transmitting and receiving unit 24 integrally make a 'U' shape. A hole 25 is formed at one end of the grounding unit 21.

The grounding unit 21, the connection unit 22, the antenna line fixing unit 23 and the transmitting and receiving unit 24 are integrally formed with entirely made of a metallic conductor, and a removed portion 32 is formed as a portion of the grounding 21 is removed so that the antenna line 31 can be easily soldered to the inside of the transmitting and receiving unit 24.

As shown in FIG. 5, the transmitting and receiving unit 24 includes a first transmitting and receiving part 24-1 connected to a vertical protrusion portion 28 formed vertically and integrally at one end of the antenna line fixing unit 23 and formed in parallel with a certain space at the antenna line fixing unit 23, and a second transmitting and receiving part 24-2 formed by being extended from the connection protrusion portion 27 protrudingly formed at the first transmitting and receiving part 24-1 and formed in parallel in a longitudinal direction of the first transmitting and receiving part 24-1.

The second transmitting and receiving part 24-2 is formed shorter than the first transmitting and receiving part 24-1. The reason for the different lengths is that the first transmitting and receiving part 24-1 and the second transmitting and receiving part 24-2 are designed to have a length of λ/4 electrically in the frequency band of 2.4 GHz and in the frequency band of 5.2 GHz and thus operated in a double band.

The length between the grounding unit 21 and the transmitting and receiving unit 24 of the multi-band antenna is the same with or smaller than the protrusion length of the connection portion 10 of the bracket 9. The height between the connection unit 22 and the transmitting and receiving unit 24 of the multi-band antenna 6 is the same with or smaller than the height of the liquid crystal frame 8 or the bracket 9.

An inner copper wire of the antenna line 31 is connected with the transmitting and receiving unit 24 by soldering, being connected to make a power feed point 24a, and an inner grounding line of the antenna line 31 is connected to the antenna line fixing unit 23 by soldering to make a grounding point 23a.

Figure 7:
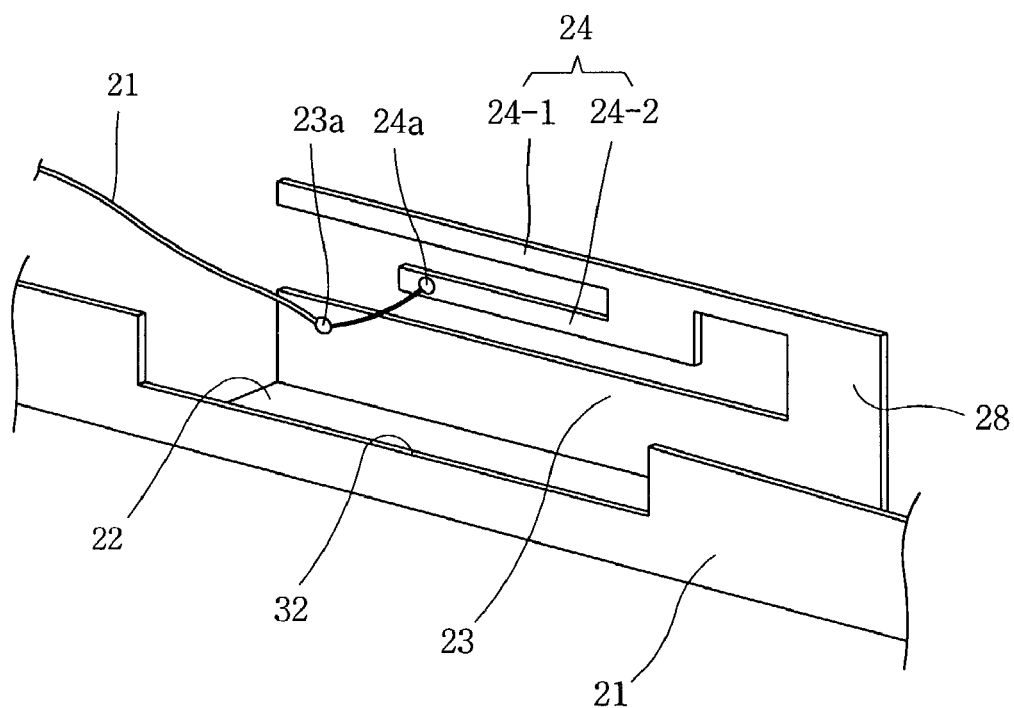
FIG. 7 is an enlarged view showing how an antenna line is connected to the multi-band antenna in accordance with the present invention.

As shown in FIGS. 6 and 7, the antenna line 31 connected to a LAN card installed inside the main body 3 is bonded at the antenna fixing unit 23 and the transmitting and receiving unit 24 of the multi-band antenna 6. A portion of the grounding unit 21 has a removed portion 32 for soldering of the antenna line 31.

Figure 8:
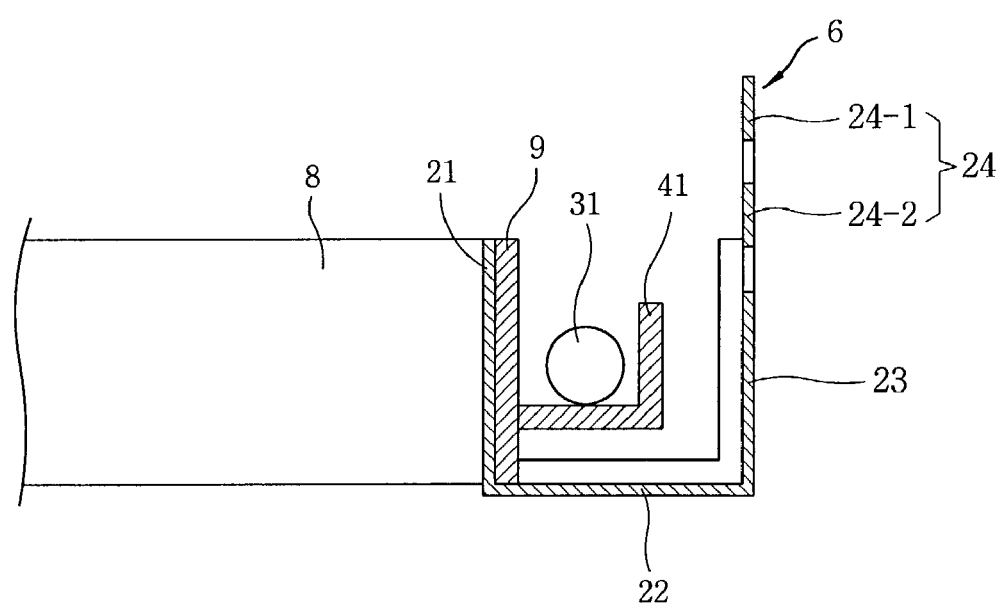
FIG. 8 is a sectional view showing how the antenna line is installed in a bracket in accordance with the present invention.

FIG. 8 is a sectional view showing how the antenna line 31 is installed in the bracket 9. A multi-band antenna line installing unit 41 is formed at about the middle portion of the bracket 9, being protruded toward the side wall 12b of the lower case 12. As illustrated, the antenna line 31 connected from the multi-band antenna 6 of the bracket 9 toward the LAN card is placed at a certain height of the side of the bracket 9 by means of the multi-band antenna line installing unit 41.

Figure 9:
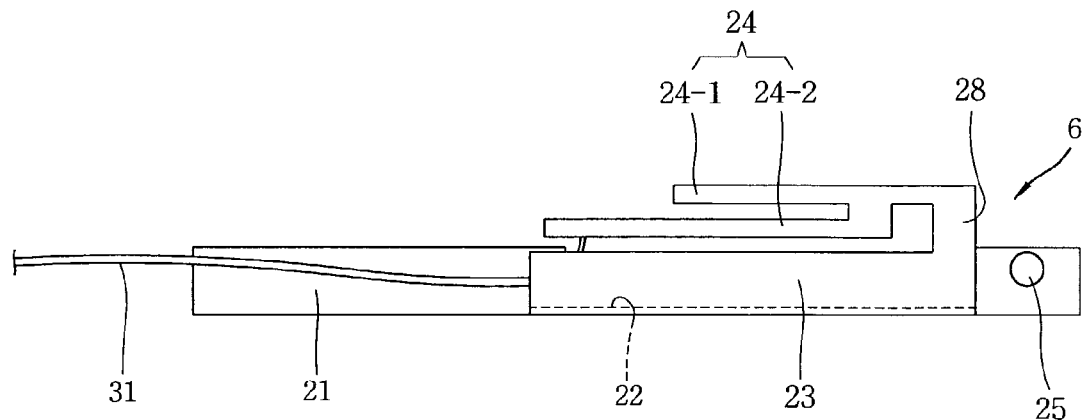
FIG. 9 is a front view showing the second embodiment of a transmitting unit of the multi-band antenna in accordance with the present invention.

FIG. 9 is a front view of a multi-band antenna in accordance with the second embodiment of the present invention. The basic structure of the multi-band antenna in accordance with the second embodiment of the present invention is similar to that of the first embodiment of FIG. 4.

In comparison with the first embodiment, a second transmitting and receiving part 24-2 is formed longer than a first transmitting and receiving part 24-1. The first transmitting and receiving part 24-1 receives an electromagnetic wave in high frequency band, while the second transmitting and receiving part 24-2 receives an electromagnetic wave in low frequency band.

Figure 10:
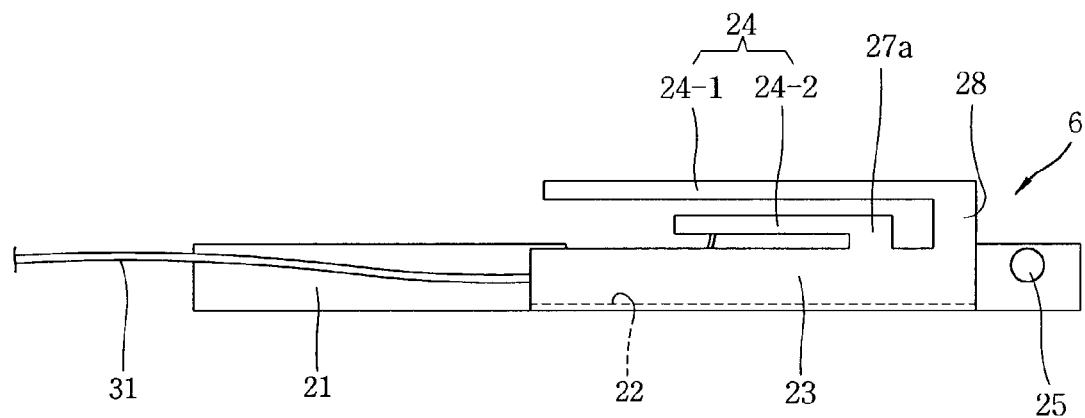
FIG. 10 is a front view showing the third embodiment of a transmitting unit of the multi-band antenna in accordance with the present invention.

FIG. 10 is a front view showing a multi-band antenna in accordance with the third embodiment of the present invention. A basic structure of multi-band antenna in accordance with the third embodiment of the present invention is similar to that of the first embodiment of FIG. 4.

In comparison with the first embodiment, a second transmitting and receiving part 24-2 is extended from the connection protrusion portion 27a protruded from the antenna line fixing unit 23, being parallel to the first transmitting and receiving part 24-1. The second transmitting and receiving part 24-2 is formed shorter than the first transmitting and receiving part 24-1 and handles the radio frequency band.

Figure 11:
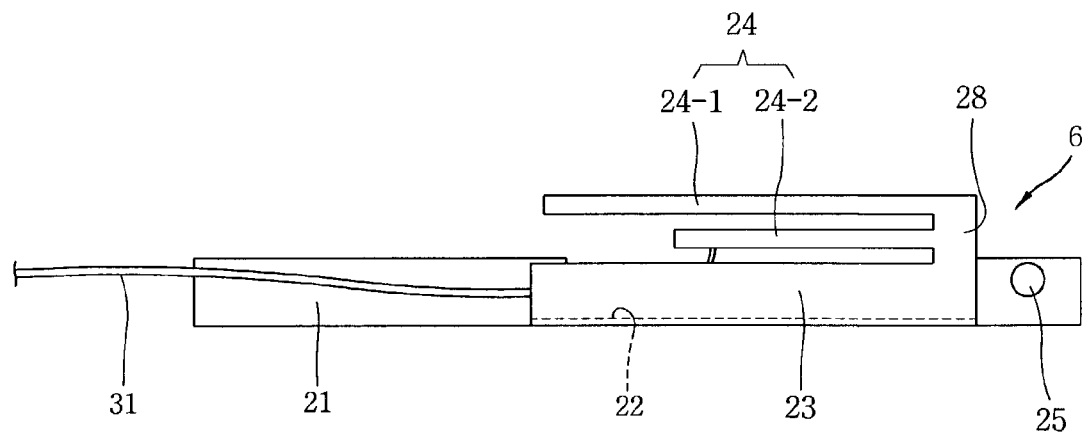
FIG. 11 is a front view showing the fourth embodiment of a transmitting unit of the multi-band antenna in accordance with the present invention.

FIG. 11 is a front view of a multi-band antenna in accordance with the fourth embodiment of the present invention. A basic structure of the multi-band antenna in accordance with the fourth embodiment of the present invention is similar to that of the first embodiment of FIG. 4.

As a difference in comparison with the first embodiment, a second transmitting and receiving part 24-2 is connected to a vertical protrusion portion 28, being formed with certain interval in parallel to a first transmitting and receiving part 24-1 and an antenna line fixing unit 23. The second transmitting and receiving part 24-2 is shorter than the first transmitting and receiving part 24-1.

In the present invention, the grounding unit 21 of the multi-band antenna 6 is positioned between the liquid crystal frame 8 and the bracket 9. But in a different way, the liquid crystal frame 8, the bracket 9 and the grounding unit 21 can be sequentially disposed and then the bracket 9 and the ground unit 21 can be fixed to the liquid crystal frame 8 with a screw.

In addition, in the present invention, the multi-band antenna 6 and the bracket 9 are simultaneously fixed at the liquid crystal frame 8 by using one screw 26. But the multi-band antenna 6 can be fixed at the bracket 9 with a screw or by soldering and then the bracket 9 can be fixed at the liquid crystal frame 21.

In the above-described embodiments, the transmitting and receiving unit 24 of the multi-band antenna 6 is operated at the double band frequency formed with the first transmitting and receiving part 24-1 and the second transmitting and receiving part 24-2. But without being limited thereto, it is natural that several transmitting and receiving parts 24 can be formed with different lengths according to a frequency band to be transmitted and received, to correspond to a multi-band.

As so far described, the multi-band antenna and the notebook computer with a built-in multi-band antenna have the following advantages.

That is, for example, first, the antenna is installed at the inner side of the upper and lower cases of the display device and since the grounding unit is insertedly installed to contact widely between the liquid crystal frame and the bracket, the liquid crystal frame and the bracket can be used as a grounding unit. The transmitting and receiving unit for transmitting and receiving a radio wave is divided into two parts to transmit and receive a radio wave in a multi-band. And, since the antenna transmitting and receiving unit and the liquid crystal are separated as long as from the grounding connection unit, shielding of electromagnetic wave due to the liquid crystal and the liquid crystal frame can be prevented.

In addition, the antenna line fixed at the antenna line fixing unit is disposed in a loop shape and the multi-band antenna line disposed together is connected toward the LAN card so as to be positioned with a certain height at the side of the bracket, which is favored for a radio communication when a user uses the computer by standing up the display device. Thus, an efficiency of the radio frequency communication is improved. Besides, since the multi-band antenna is positioned between the liquid crystal and the lower case, the horizontal length of the display device is not increased. Since the multi-band antenna can be formed as high as or smaller than the liquid crystal frame or the bracket, the overall height of the multi-band antenna can be reduced, and thus, the thickness of the part of the display device inevitably protruded due to installation of the multi-band antenna can be reduced.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A multi-band antenna of a notebook computer in which a display device is coupled to cover a main body and has a display frame fixing a display and a bracket fixed at an outer side of the frame, comprising:
    a grounding unit installed within the display device and between the frame and a case of the display device;
    a grounding connection unit extended outwardly from a portion of the grounding unit;
    an antenna line fixing unit extending outwardly from an outer portion of the grounding connection unit, wherein the grounding unit, the antenna line fixing unit and the grounding connection unit extending therebetween are each configured to extend in different two-dimensional planes; and
    at least two or more transmitting and receiving units are configured to extend from the antenna line fixing unit to transmit and receive an electromagnetic wave.

2. The antenna of claim 1, wherein the connection unit, the antenna line fixing unit and the transmitting and receiving unit are integrally formed by bending a plate made of a conductive material to a 'U' shape.

3. The antenna of claim 1, wherein the transmitting and receiving units include a first transmitting and receiving part connected to a vertical protrusion portion formed at one portion of the antenna line fixing unit and a second transmitting and receiving part installed side by side so as to be electrically connected to the first transmitting and receiving part.

4. The antenna of claim 3, wherein the second transmitting and receiving part is formed shorter than the first transmitting and receiving part.

5. The antenna of claim 3, wherein the second transmitting and receiving part is formed longer than the first transmitting and receiving part.

6. The antenna of claim 3, wherein the second transmitting and receiving part is formed connected to an extended protrusion portion formed at a certain portion of the first transmitting and receiving part.

7. The antenna of claim 3, wherein the second transmitting and receiving part is formed connected to an extended protrusion portion formed at a certain portion of the antenna line fixing unit.

8. The antenna of claim 3, wherein the second transmitting and receiving part is formed connected to the vertical protrusion portion.

9. A notebook computer with a built-in multi-band antenna comprising:
    a main body having a PCB therein that is connected to a radio communication device, and a keyboard positioned at an upper surface;
    a display device rotatably installed on the main body, the display device comprising
        a lower case having a bottom and a side wall; and
        a display unit mounted at the lower case and having a frame installed at an outer circumference; and
    a multi-band antenna having a grounding unit and at least two or more transmitting and receiving units with different lengths, and being installed between the frame and the side wall of the lower case as the grounding unit is coupled to the frame, wherein the grounding unit and an antenna line fixing unit connected to the two or more transmitting and receiving units are each configured to extend in different two-dimensional planes.

10. The notebook computer of claim 9, wherein the multi-band antenna is installed at left and right sides of the display device.

11. The notebook computer of claim 9, further comprising: a bracket having a connection portion of which one side is fixed at the side of the frame and the other side is fixed at a side wall of the lower case, the grounding unit being positioned between the frame and the bracket.

12. The notebook computer of claim 9, wherein a screw fixing hole is formed at the side of a liquid crystal frame, a hole corresponding to the screw fixing hole is formed at the bracket and the grounding unit, and a screw penetrates the screw fixing hole, the bracket and the hole of the grounding unit to fix the bracket and the grounding unit to the liquid crystal frame.

13. The notebook computer of claim 9, further comprising: a bracket having a connection portion of which one side is fixed at the side of the frame and the other side is fixed at a side wall of the lower case, the grounding unit being fixed at the bracket.

14. The notebook computer of claim 9, wherein the multi-band antenna comprises:
 a grounding connection unit extended outwardly of a lower portion of the grounding unit and disposed at the lower side of the bracket;
 the antenna line fixing unit formed at an outer portion of the grounding connection unit; and
 a transmitting and receiving unit extended from an end of the antenna line fixing unit.

15. The notebook computer of claim 9, further comprises an antenna line of which one end is coupled to the transmitting and receiving unit and the other end is coupled to the radio communication device.

16. The notebook computer of claim 9, wherein the two or more transmitting and receiving units extend directly from the antenna line fixing unit, extend directly from an extension unit configured to project from the antenna line fixing unit, a first transmitting and receiving unit extends directly from the antenna line fixing unit and a second transmitting and receiving unit extends directly or indirectly from the first transmitting and receiving unit, or the first transmitting and receiving unit extends directly from the extension unit and the second transmitting and receiving unit extends directly or indirectly from the first transmitting and receiving unit.

17. The notebook computer of claim 16, wherein the two or more transmitting and receiving units are different lengths or extend in an identical two-dimensional plane.

18. The antenna of claim 1, wherein the connecting unit is configured to be bent substantially perpendicular to and extended from a respective edge of each of the grounding unit and the antenna line fixing unit to connect the grounding unit and the antenna line fixing unit.

19. The antenna of claim 1, wherein the grounding unit and the antenna line fixing unit are configured to extend in substantially parallel two-dimensional planes.

20. A mobile electronic equipment with an internal antenna comprising:
 a case having an opened portion;
 a display panel exposed through the opened portion of the case for displaying text or images;
 an electrically conductive support unit positioned within the case;
 an antenna fastened to the support unit for enabling a radio communication, the antenna being grounded to the support unit in a state of being inserted in the case, wherein the antenna comprises,
  a grounding unit in conductive contact to the support unit,
  a antenna line fixing unit spaced at a distance from the grounding unit, and
  a connecting unit coupled between the grounding unit and the antenna line fixing unit, wherein the connecting unit, the grounding unit and the antenna line fixing unit are configured to extend in different two-dimensional planes.

21. The equipment of claim 20, wherein the antenna comprises two or more transmitting and receiving units configured to extend from the antenna line fixing unit to transmit and receive an electromagnetic wave.

22. The equipment of claim 21, wherein the two or more transmitting and receiving units extend directly from the antenna line fixing unit, extend directly from an extension unit configured to project from the antenna line fixing unit, a first transmitting and receiving unit extends directly from the antenna line fixing unit and a second transmitting and receiving unit extends directly or indirectly from the first transmitting and receiving unit, or the first transmitting and receiving unit extends directly from the extension unit and the second transmitting and receiving unit extends directly or indirectly from the first transmitting and receiving unit.

23. The equipment of claim 22, wherein the two or more transmitting and receiving units are different lengths or extend in an identical two-dimensional plane.

24. The equipment of claim 21, wherein the connecting unit is configured to be bent substantially perpendicular to and extended from a respective edge of each of the grounding unit and the antenna line fixing unit to connect the grounding unit and the antenna line fixing unit.

25. The equipment of claim 20, wherein the grounding unit and the antenna line fixing portion are configured to extend in parallel two-dimensional planes.

* * * * *